Patented Dec. 18, 1951

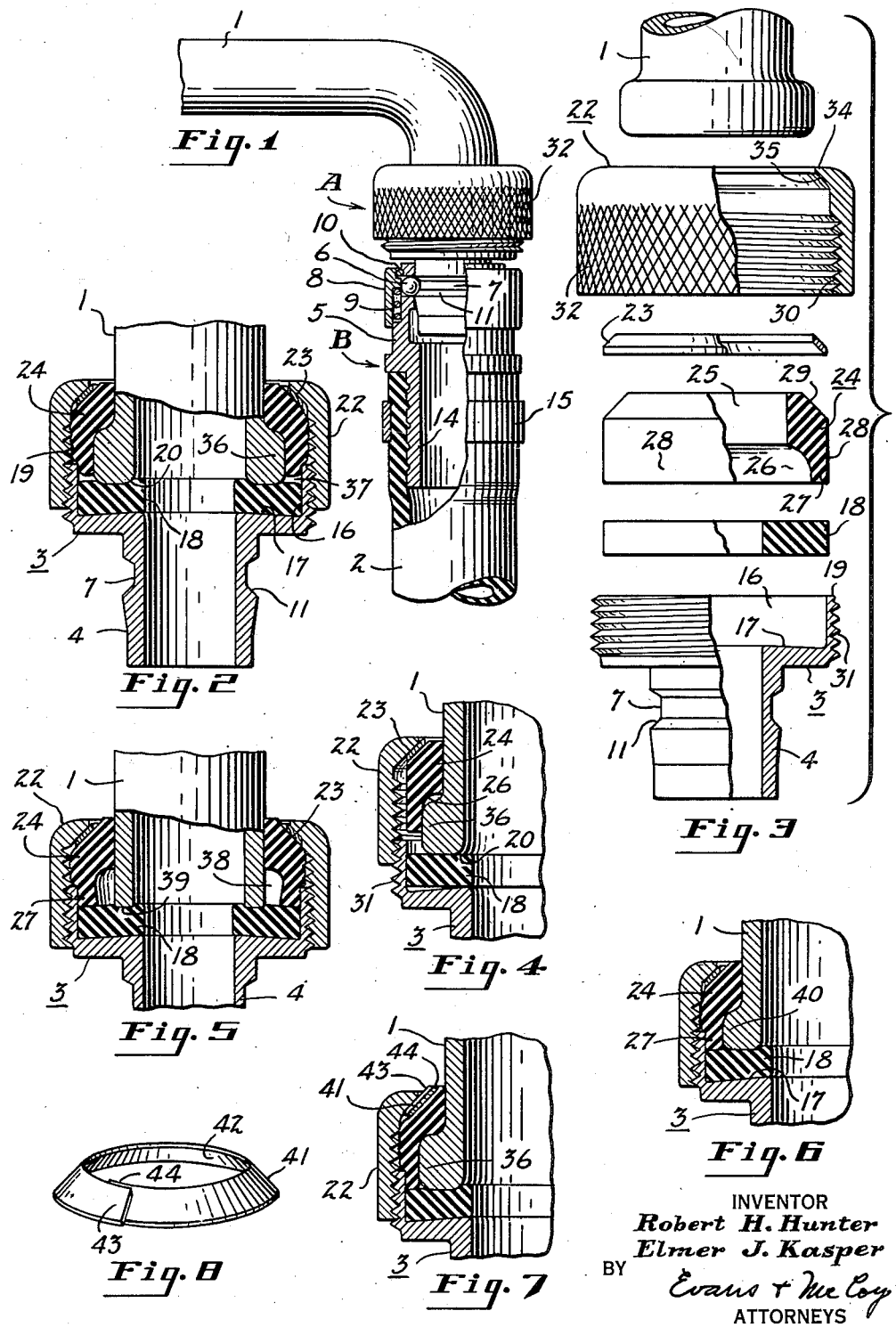

2,578,933

UNITED STATES PATENT OFFICE 2,578,933

COUPLING

Robert H. Hunter, Gates Mills, and Elmer J. Kasper, Cleveland, Ohio; said Kasper assignor to said Hunter Application December 2, 1947, Serial No. 789,228

16 Claims. (Cl. 285—90)

This invention relates to coupling devices and more particularly to detachable connectors for joining flexible hoses and the like to tubular conductors, valves, faucets and the like.

It is frequently desired to attach flexible rubber hoses and other types of conduits to sink and tub faucets or valve outlets. Many types of faucet connectors have been devised for the purpose of attaching shower and bathtub sprays to faucets, for attaching hoses to tub spigots for washing and laundry purposes, and, more recently, for attaching flexible conduits to taps for hot and cold water used in automatic and semi-automatic clothes washing machines and dishwashers.

The smooth, plated and polished surfaces customarily used on sink and tub faucets make it difficult to attach conventional hose connectors thereto, particularly when the particular water system is maintained under relatively high pressures such as forty to sixty pounds per square inch or more. It is therefore one of the principal objects of the present invention to provide an improved faucet connector which, without being bulky or cumbersome, can be securely attached to the discharge end of a faucet and which will retain its grip on the faucet under conditions of high water pressure. More specifically the invention aims to provide a faucet connector of the type employing a jam or compression gasket which embraces the faucet end in a tight frictional grip to hold the connector in place in combination with a sealing gasket or washer disposed across the discharge end of the faucet, the sealing gasket being compressed between faucet end and the body of the connector.

Another object is to provide in a connector of the character mentioned a retainer or jam gasket which is formed at one end with a circumferentially extending relief or undercut which is collapsible and presents but a relatively small area of contact to bear axially against the annular sealing gasket of the assembly when the parts are drawn together.

Another object is to provide, in a connector employing an annular sealing gasket between the connector body and the end of a faucet, means for effectuating a crowning of the central portion of the sealing gasket so that in assembling the connector to a faucet engagement between the faucet end and the sealing gasket occurs initially at the central portion of the gasket and progresses radially outwardly therefrom to effect a concentration of pressure between the inner or central portions of the gasket and the annular inner edge corner of the end of the faucet.

Still further objects and advantages of the invention are concerned with certain details of connector construction and arrangements of parts including: a split slip ring of generally conical form having overlapping ends for expansion and contraction in fitting the ring over enlarged or lipped faucet ends; a compression ring member or collar having an internal conical face for imparting a compressive force to a deformable jam washer or gasket with components both radial and axial; and a combination of jam and sealing washers cooperating to seal the end of a faucet to imbed the latter in resilient cushioning material upon assembly of the connector to the faucet.

Another object is to provide in a quick detachable coupling for attaching a flexible hose to a faucet the combination of an improved connector or spigot element for embracing and frictionally gripping the discharge end of a faucet and a quick release socket or coupling element permanently fastened to the end of the flexible hose, so that one element of the coupling may be securely and relatively permanently attached to the faucet and the other or hose element of the coupling may be attached thereto and detached therefrom at will.

The above and other objects of the invention will become apparent as the following detailed description proceeds; this description being made in connection with the accompanying drawings forming a part of the specification. Like parts throughout the several views are indicated by the same numerals of reference. In the drawings:

Figure 1 is a side elevational view, partly in section and with parts broken away and removed, of a quick detachable coupling combination including a faucet connector element, showing the same attached to the discharge end of a faucet;

Fig. 2 is an axial sectional detail with parts removed, showing the internal structure of the connector, this view being enlarged with respect to Fig. 1;

Fig. 3 is an expanded view showing the several parts of the connector, their relative positions, and the end of the faucet to which the connector is attached, the resilient deformable gaskets being shown in their molded or unstressed shapes;

Fig. 4 is a fragmentary detail, in section, showing the relative positions of the parts as initially assembled on a faucet;

Fig. 5 is a fragmentary sectional detail showing the connector attached to a faucet having a discharge end of cylindrical form;

Fig. 6 is a sectional detail showing the relationship of the parts when the connector is attached to the end of a faucet having a relatively narrow lip or bead;

Fig. 7 is a fragmentary sectional detail of a connector showing a split or modified form of slip ring for use with faucets having beads or lips that are relatively broad or wide; and Fig. 8 is a perspective view of the split slip ring of Fig. 7.

The quick detachable coupling assembly comprises a faucet connector unit A which is attached to the end of faucet 1 and may be allowed to remain relatively permanently in place, and a unit B to which is permanently attached one end of flexible hose 2. The connector unit A includes a body member 3 having a tubular discharge extension 4 that is received telescopically within a tubular member 5 of the hose unit B. A number of ball detents, one of which is shown at 6, are carried in radial apertures or through sockets formed as by drilling in the upper end of the tubular member 5. The balls are partially receivable in a circumferential groove 7 formed about the upper end of the tubular extension 4 and thus serve to lock together the discharge tube 4 of the connector A and the tube 5 of the faucet unit B. A sliding collar 8 is formed with an internal circumferentially extending cam ridge to engage the detent balls 6. A compression spring 9 retained in an annular space between the upper end of the tubular member 5 and the sliding collar 8 holds the latter against a retaining snap ring 10 so that the circumferential cam ridge is normally positioned to retain the detent balls in projected locking positions. To release the detent balls for uncoupling of the unit B from the unit A the collar 8 is drawn downwardly against the force of the spring 9 so that, as the parts are separated, the detent balls 6 can be moved radially outwardly into their sockets by inclined face 11 of the annular detent groove 7. To assemble the units of the device the collar 8 is manually retracted against the force of the spring and the tubular member 5 is telescoped over the discharge tube or plug extension 4 of the unit A. Upon release of the sliding collar 8 the detent balls 6 are forced into the channel or groove 7 by the inclined face of the cam ridge thus locking the parts together.

The flexible hose 2 may be used for conducting water from faucet 1 to a shower or shampoo spray, a clothes or dish washing machine, or other appliances and devices. One end of the hose is received in telescopic or embracing relation on a reduced diameter end portion 14 of the tubular member 5 and a constricting or clamping collar or ball 15 is tightened about the end of the hose to clamp the latter against the end portion 14 of the tubular member.

The body member 3 of the faucet unit A is of general cup shape having an internal relatively shallow circular recess which is continuous with the centrally located passage in the tubular extension 4. This body member may be conveniently formed as a screw machine product using any suitable material such as iron, brass, or aluminum. It may also be formed as by casting, using brass or one of the light metals, or by injection molding of a plastic material. Circular side walls 16 of the body recess are cylindrical or substantially so and bottom 17 which may be flat is preferably of convex form, the center being slightly raised above the marginal portions to provide a central crowned portion.

An annular relatively flat sealing gasket or washer 18 is received in a recessable body member and has a central opening which is continuous with the opening in the tubular extension 4. The gasket 18, which is deformable and resilient, has a circular outer periphery of substantially the same diameter of the circular recess wall 16 so that in assembling the parts the outer edge walls of the gasket have a sliding friction fit in the cylindrical wall 16 of the body member. The gasket or washer 18 may be formed as by stamping or cutting from sheet rubber stock having a consistency substantially like that used in garden hose washers, refrigerator sealing gaskets, automotive vehicle tires and the like. It may also be formed by molding or by cutting rings from extruded tubular rubber stock of the consistency mentioned. In its unstressed condition this sealing gasket is of less thickness than its radial section width and when seated in the body recess the upper face or side of the gasket is disposed below upper end or edge 19 of the body member.

By reason of the crowning of the floor or bottom wall 17 of the recess the upper or exposed face of the gasket 18 is similarly crowned or centrally raised in assembly. This central raising or crowning of the sealing gasket causes the central portion thereof to engage circular or annular inner edge corner 20 of the outlet end of the faucet 1 with greater force or pressure than prevails between the outer portions of the gasket and the faucet end, thus establishing an effective liquid-tight seal between the parts which persists during slight angular distortion or displacement of the connector on the faucet end.

In assembling the connector on a faucet a circular collar or retainer member 22 is first threaded or telescoped over the faucet end, followed by a slip ring or circular anti-friction element 23, and a jam washer or ring gasket 24 formed of resilient deformable material such as rubber having a consistency similar to that used for the washer or gasket 18. Of course, other materials and other consistencies may be used.

The gasket 24, which may be molded, is illustrated in its unstressed condition in Fig. 3. Of generally ring like form, the gasket is of greater axial extent than radial thickness and has an internal substantially cylindrical face 25 which at the lower end of the gasket, being the end disposed toward the washer gasket 18 previously mentioned, is undercut or relieved around the entire inner circumference of the gasket, or substantially so, to provide a recess which has a curved or arcuate concave wall 26. This gasket recess reduces the thickness of the gasket at its lower end and provides an axially extending relatively thin integral flange portion 27 which extends as a continuation of outer cylindrical wall 28. About the upper end of the gasket the outer edge corner is beveled, providing a tapered or conical face 29 to receive the matching conical face on the slip ring 23. The slip ring, made of metal such as brass or steel, preferably polished at least on its outer face, is formed to conical shape to match the conical faces 29 of the deformable jam washer 24 and 35 of the retainer collar 22.

The retainer member or collar 22 is formed with internal threads 30 which match threads 31 on the outside of the body member 3 and has an external knurled gripping surface 32 to facilitate manual turning of the retainer in assembling the unit on a faucet. The interfitting threads serve to draw the parts together, the retainer 22 being formed with an inwardly directed radial flange 34 which overlies and engages the conical slip ring 23. Thus, during assembly, axial force is applied to the slip ring 23 and in turn to the jam gasket 24.

In its molded or unstressed condition the jam washer or gasket 24 is slightly less in diameter across its central opening than the external diameter of the faucet ends with which it is to be used. Thus in threading or assembling the washer or gasket onto the faucet end the washer is slightly distended so that the cylindrical face 25 maintains a slight initial frictional grip on the faucet. As the body member 3 and the retainer 22 are drawn together by the threaded connection therebetween the axial force, applied to the gasket or jam washer 24 through conical slip ring 23 acting over the conical face 29 of the jam washer, tends to increase the radial compressive force of the gasket washer against the faucet end thereby increasing the frictional grip of the gasket on the faucet.

As the tightening of the connector parts together is continued by the screwing of the threaded collar or sleeve 22 onto the body member 3 the latter is drawn upwardly or axially toward or against the end of the faucet compressing the sealing washer 18 between the faucet end and the crowned floor 17 of the body recess. This drawing up of the sealing gasket or washer 18 against the end of the faucet provides a fluid-tight seal which strongly resists the flow of water out between the meeting surfaces between the gasket 18 and, on one hand, the faucet, and on the other hand, the crowned floor 17.

The compression of the jam washer 24 progressively deforms the latter so that it tends to flow and completely fill the space between the faucet end and the retainer sleeve 22. This deformation of the gasket forces the outer surfaces of the same into frictional engagement with the walls of the collar or retainer 22, including the threads 30, so that reverse turning of the sleeve is strongly resisted and the connector remains in place on the faucet end with the jam washer 24 under strong deforming compression and the sealing gasket or washer 18 compressed axially between the faucet end and the floor of the body recess.

The use of conical internal faces on the retainer flange 34 and the slip ring 23 in combination with a conical or tapered end on the jam gasket 24 permits the gasket to extend out through the end of the retainer member or collar and effect maximum contact with and frictional grip on a faucet or spigot having a relatively short snout or discharge end.

In Figs. 1 through 4 the faucet 1 is shown with an enlarged radial bead or lip 36 which may be completely circumferential in extent and which in initial assembly is received in the bottom end recess of the jam washer 24, the concave face 26 of the washer recess somewhat conforming to the curvature of the faucet bead. Fig. 4 shows the parts in a state of initial assembly, the rubber sealing gaskets or washers being substantially unstressed other than the stretching of the washer 24 required in placing the same over the faucet end and the slight radial compression of the sealing gasket 18 required in fitting the same into the body recess. Upon drawing together of the parts to compress the gaskets and secure the connector on the faucet end, the resilient gaskets deform substantially to the shape shown in Fig. 2. So assembled a slight clearance indicated at 37 may prevail between the end of the thin flange 27 of the jam gasket 24 and the upper face of the sealing washer 18. Thus the axial stress in the connector is concentrated on the end of the faucet so that a strong sealing action results from the compression of the washer 18.

In Fig. 5 is illustrated a combination in which the connector is assembled on the end of a "straight" faucet, the faucet having no bead or lip corresponding to the bead 36 previously mentioned. In such an assembly the thin flange 27 of the gasket 24 is laterally unsupported and is subject to deformation or collapse into annular space 38 resulting from the undercutting of the gasket end. This lateral deformation of the gasket flange limits the axial force the flange exerts against the sealing washer 18 and permits the latter to be drawn upwardly against the faucet so that the axial stress in the connector is concentrated at narrow end face 39 of the faucet.

The frictional grip of the jam washer or gasket 24 on the faucet or spigot utilized in retaining the connector in assembled relation to the faucet is effected largely through distortion of such gasket under the pressure applied obliquely thereto by the conical faces of the slip ring 23 and the flange 34 of the retainer. The oblique force applied to the ring gasket includes one component which acts radially to force the gasket firmly against the faucet and thereby maintain a strong frictional grip on the latter. Another component of the compressive force in the gasket is axial and acts to oppose or resist extrusion of the gasket out through the opening in the upper end of the retaining collar 22 between the flange 34 and the outer face of the faucet. In this connection it is observed that the initial frictional grip of the ring gasket on the faucet obtained by distension of the ring gasket in assembly, although not essential to operation of the device, is particularly effective in opposing axial shifting of the gasket as the retainer 22 is tightened.

Fig. 6 illustrates a construction in which the connector is assembled on a faucet having an annular lip or bead 40 which is relatively small or narrow but in other respects corresponds to the bead or lip 36 described in connection with Figs. 1 through 4. In the arrangement shown in Fig. 6 the jam washer or gasket 24 is positioned on the faucet end and drawn down in assembly so that the lower end of the narrow flange 27 abuts the upper face of the sealing washer 18. A positive seal is maintained between the end of the faucet 1 and the washer 18 by reason of the axial stress in the washer and the crowning of the bottom face 17 of the body recess.

For use in applications requiring an extremely strong connection such, for example, as with high water pressures or with an axial load applied to the connector, a radially split slip ring such as shown in Figs. 7 and 8 may be employed. This ring, formed of thin sheet metal, has a conical upper face 41 which matches and bears against the conical internal face 36 of the retainer member or collar 22. The slip ring also has an internal conical face 42 which receives and matches the conical face or bevel 29 of the jam washer 24. The internal diameter of the split ring in its unstressed condition is less than the diameter across the enlarged or beaded end 36 of the faucet. In assembling the connector to a faucet using the split slip ring of Figs. 7 and 8 the slip ring is expanded over the end of the faucet, returning to the shape shown in Fig. 8 by inherent resiliency thereof. Ends 43 and 44 of the split slip ring overlap one another in sliding relation so as to maintain a substantially continuous circumferentially extending metallic surface in all normal positions of expansion and contraction. By reason of the greater radial extent of the split ring shown in Figs. 7 and 8 as compared to the slip rings of the preceding figures, the rubber of the jam washer 24 is constrained against flowing axially from between the faucet and the retainer 22 and relatively greater compressive forces can be applied to the jam gasket thereby effecting stronger frictional grip of the gasket on the faucet.

The principles of the present invention may be utilized in various ways, numerous modifications and alterations being contemplated, substitution of parts and changes in construction being resorted to as desired, it being understood that the articles shown in the drawings and described above are given merely for purposes of explanation and illustration without intending to limit the scope of the claims to the specific details disclosed.

What we claim is:

1. A faucet connector comprising a body member having a recess and a discharge opening communicating with said recess, a deformable gasket disposed in the recess and having an opening continuous with the discharge opening of the body member, an annular deformable gasket for embracing a faucet end, a collar surrounding the annular gasket and having connection with the body member for drawing the parts together in compressing the annular gasket against a faucet embraced thereby and in holding the first mentioned gasket against the end of the faucet, the relative size of the gaskets permitting endwise abutment of the annular gasket against the first mentioned gasket in assembly.

2. A faucet connector comprising a body member having a recess and a discharge opening communicating with said recess, a flat ring gasket of resilient deformable material disposed in the recess and having a central opening continuous with the discharge opening of the body member, said ring gasket being of greater radial dimension than of axial thickness, an annular deformable gasket for embracing a faucet end, a collar surrounding the annular gasket and having connection with the body member for drawing the parts together in compressing the annular gasket against a faucet embraced thereby and in holding the first mentioned gasket against the end of the faucet, the relative size of the gaskets permitting endwise abutment of the annular gasket against the first mentioned gasket in assembly.

3. A faucet connector comprising a body member having a recess and a discharge opening communicating with said recess, a deformable gasket disposed in the recess and having an opening continuous with the discharge opening of the body member, an annular deformable gasket for embracing a faucet end, a collar surrounding the annular gasket and having connection with the body member for drawing the parts together in compressing the annular gasket against a faucet embraced thereby and in holding the first mentioned gasket against the end of the faucet, the relative size of the gaskets permitting endwise abutment of the annular gasket against the first mentioned gasket in assembly, and a slip ring interposed between the annular gasket and the collar to permit facile relative turning of the parts in assembly, the slip ring being transversely split and having overlapped ends at the split.

4. In a faucet coupling having a body member and a retainer member providing a socket for receiving the end of a faucet, a gasket of resilient deformable material receivable within the retainer member to be compressed thereby in embracing relation to a received faucet end, the gasket being ring-like and having a substantially cylindrical inner wall undercut at one end of the gasket to provide a substantially annular relatively thin walled flange at said one end of the gasket, and a second deformable gasket disposed in abutting relation against the edge of the thin walled flange.

5. In a faucet coupling having a body member and a retainer member providing a socket for receiving the end of a faucet, a gasket of resilient deformable material receivable within the retainer member to be compressed thereby in embracing relation to a received faucet end, a second gasket of resilient deformable material receivable in abutting relation against one end of the first mentioned gasket and between the body member and the end of the received faucet, and means for holding the members in assembled relation with the gaskets under compression.

6. In a faucet coupling having a body member and a retainer member providing a socket for receiving the end of a faucet, a gasket of resilient deformable material receivable within the retainer member to be compressed thereby in embracing relation to a received faucet end, a second gasket of resilient deformable material receivable in abutting relation against one end of the first mentioned gasket and between the body member and the end of the received faucet, slip means between the retainer member and the first named gasket to reduce friction therebetween for relative turning of the retainer member on such gasket, the slip means being transversely split and having overlapped ends at the split, and interconnecting threads on the members for drawing the same together upon relative turning thereof in assembling the coupling on a faucet.

7. In a faucet coupling, an annular jam gasket of elastic deformable material for embracing a faucet, the unstressed gasket having a substantially cylindrical inner face undercut at one end and an outer face beveled at the other end of the gasket, and means for compressing the gasket axially, said compressing means including means rigidly embracing the outer face of the gasket substantially its entire axial extent to limit radial expansion of the gasket.

8. In a faucet coupling, an annular jam gasket of elastic deformable material for embracing a faucet, the unstressed gasket being of greater axial length than radial thickness and having a substantially cylindrical inner face undercut at one end and an outer face beveled at the other end of the gasket, and means for compressing the gasket axially, said compressing means including means rigidly embracing the outer face of the gasket substantially its entire axial extent to limit radial expansion of the gasket.

9. In a faucet coupling, an annular jam gasket of elastic deformable material for embracing a faucet, the unstressed gasket having substantially cylindrical inner and outer faces, the inner face being undercut at one end of the gasket, and the outer face being relieved at the other end of the gasket, and means for compressing the gasket axially, said compressing means including means rigidly embracing the outer face of the gasket substantially its entire axial extent to limit radial expansion of the gasket.

10. In a faucet coupling, an annular jam gasket of elastic deformable material for embracing a faucet, the unstressed gasket being of greater axial length than radial thickness and having substantially cylindrical inner and outer faces, the inner face being undercut at one end of the gasket, and the outer face being relieved at the other end of the gasket, and means for compressing the gasket axially, said compressing means including means rigidly embracing the outer face of the gasket substantially its entire axial extent to limit radial expansion of the gasket.

11. In a faucet coupling, an annular jam gasket of elastic deformable material for embracing a faucet, the unstressed gasket having a cylindrical outer face and an inner face formed at one end of the gasket with a concave undercut, the gasket being of greater axial length than radial thickness, and means for compressing the gasket axially, said compressing means including means rigidly embracing the outer face of the gasket substantially its entire axial extent to limit radial expansion of the gasket.

12. In a faucet coupling having a body member and a retainer member providing a socket for receiving the end of a faucet, a gasket of resilient deformable material receivable within the retainer member to be compressed thereby in embracing relation to a received faucet end, the gasket being ring-like and the outer face thereof being relieved at one end providing a tapered face inclined at an acute angle to the axis of the gasket, the gasket also being undercut at its other end through the greater portion of its radial thickness to provide an integral axially extending deformable circular flange, and the retainer member including radially directed flange means having a similarly inclined surface for engaging the inclined face of the gasket.

13. In a faucet coupling, a body member having an end face to bear against the end of a faucet, a resilient deformable gasket seated against the body face, the body having a passage opening through the end face thereof and the gasket having an aperture in registry with the passage opening, means for retaining the body in assembled relation with a faucet and with the gasket interposed and compressed between the faucet and the body end face, the gasket being substantially flat in its unstressed condition and the body face being centrally crowned about the passage opening to effect a distortion and crowning of the gasket in assembly whereby the compressive force exerted on the gasket is greatest adjacent the aperture therein.

14. In a faucet coupling, a body having a recess therein, a resilient deformable sealing washer in the recess, said washer being substantially flat in its unstressed condition, a passage in the body and opening through the bottom of the recess, a central aperture in the washer in registry with the passage opening, a jam gasket of resilient deformable material for embracing a faucet, a retainer surrounding the jam gasket, the retainer being connected to the body for securing the parts together and for drawing the end of an embraced faucet against the bottom of the recess with the flat washer interposed and compressed therebetween, the recess bottom being centrally crowned about the passage opening to effect a distortion and crowning of the flat gasket in assembly whereby the compression of the flat gasket is greater adjacent the aperture therein than at the outer portions of the gasket.

15. In a faucet coupling having a body member and a retainer member providing a socket for receiving the end of a faucet, the retainer member having inwardly directed flange means defining a substantially circular opening into the socket, a gasket of resilient deformable material receivable within the retainer member to be compressed thereby in embracing relation to a received faucet end, and slip means interposed between the retainer member and the gasket, the slip means comprising a resilient thin metal ring having an inside diameter less than and an outside diameter greater than the diameter of said opening, the metal ring being radially split and overlapped at the split to permit gap free expansion of the ring in admitting a faucet end to the socket.

16. In a faucet coupling having a body member and a retainer member providing a socket for receiving the end of a faucet, the retainer member having inwardly directed flange means defining a substantially circular opening into the socket, a gasket of resilient deformable material receivable within the retainer member to be compressed thereby in embracing relation to a received faucet end, and slip means interposed between the retainer member and the gasket, the slip means comprising a split ring of thin resilient metal having an inside diameter less than and an outside diameter greater than the diameter of said opening, the metal ring being substantially conical in shape and having portions overlapped at the split to permit gap free expansion of the ring in admitting a faucet end to the socket.

ROBERT H. HUNTER.
ELMER J. KASPER.

REFERENCES CITED

The following references are of record in the file of this patent:

UNITED STATES PATENTS

| Number | Name | Date |
|---|---|---|
| Re. 20,782 | Hooper | July 5, 1938 |
| 1,005,123 | Austin | Oct. 10, 1911 |
| 1,122,246 | Beam | Dec. 29, 1914 |
| 2,282,738 | Moore | May 12, 1942 |
| 2,366,161 | Tweedale | Jan. 2, 1945 |
| 2,431,120 | Howe | Nov. 18, 1947 |

FOREIGN PATENTS

| Number | Country | Date |
|---|---|---|
| 63,444 | Norway | Apr. 15, 1944 |